United States Patent
Hwang et al.

(10) Patent No.: US 9,582,504 B2
(45) Date of Patent: Feb. 28, 2017

(54) METHOD FOR PROVIDING PLAYLIST, REMOTE CONTROLLER APPLYING THE SAME, AND MULTIMEDIA SYSTEM

(75) Inventors: Byung-jin Hwang, Suwon-si (KR);
Dong-jin Lee, Suwon-si (KR);
Young-jun Ryu, Suwon-si (KR);
Jae-hong Ahn, Yongin-si (KR);
Hye-jeong Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 807 days.

(21) Appl. No.: 13/331,058

(22) Filed: Dec. 20, 2011

(65) Prior Publication Data

US 2012/0185770 A1 Jul. 19, 2012

(30) Foreign Application Priority Data

Jan. 17, 2011 (KR) .................. 10-2011-0004542

(51) Int. Cl.
*G06F 3/00* (2006.01)
*G06F 17/30* (2006.01)

(52) U.S. Cl.
CPC .. *G06F 17/30017* (2013.01); *G06F 17/30053* (2013.01)

(58) Field of Classification Search
CPC ......... H04N 21/4622; H04N 21/41407; H04N 21/4184; H04N 21/4227; H04N 21/4583; H04N 21/4788; H04N 21/482; H04N 21/4825; H04N 21/6125; H04N 5/44543; H04N 7/163; H04N 7/17318; G10H 1/0058

USPC .......................................... 715/716
See application file for complete search history.

(56) References Cited

U.S. PATENT DOCUMENTS

| 6,192,340 | B1 | 2/2001 | Abecassis |
| 7,363,591 | B2 | 4/2008 | Goldthwaite et al. |
| 2001/0012020 | A1 | 8/2001 | Stautner et al. |
| 2002/0120925 | A1* | 8/2002 | Logan .................. A23L 1/3002 725/9 |

(Continued)

FOREIGN PATENT DOCUMENTS

| KR | 1020040067993 A | 7/2004 |
| KR | 1020090051581 A | 5/2009 |

(Continued)

OTHER PUBLICATIONS

Woody Leonhard, "Windows 7 All-in-One for Dummies," Sep. 2009, 12 pages.*

(Continued)

*Primary Examiner* — Omar Abdul-Ali
(74) *Attorney, Agent, or Firm* — Sughrue Mion, PLLC

(57) ABSTRACT

A method for providing a playlist, a remote controller applying the same, and a multimedia system are provided. The method for providing a playlist includes displaying a plurality of content lists of a plurality of kinds of contents in which contents of a same kind are arranged together, the plurality of content lists being displayed on a first area of a screen, if at least two different kinds of contents are selected from the plurality of content lists in a selecting, collecting the selected contents of the at least two different kinds of contents, and generating and displaying a playlist including play information regarding the collected contents of the at least two different kinds of contents.

15 Claims, 9 Drawing Sheets

(56) References Cited

U.S. PATENT DOCUMENTS

| | | | |
|---|---|---|---|
| 2004/0140995 A1 | 7/2004 | Goldthwaite et al. | |
| 2004/0237120 A1* | 11/2004 | Lewin | H04N 7/56 725/135 |
| 2008/0148152 A1* | 6/2008 | Blinnikka | G06F 3/0486 715/719 |
| 2008/0155059 A1* | 6/2008 | Hardin | H04N 7/17336 709/218 |
| 2009/0183207 A1 | 7/2009 | Patel et al. | |
| 2010/0162324 A1 | 6/2010 | Mehta et al. | |

FOREIGN PATENT DOCUMENTS

| | | |
|---|---|---|
| KR | 10-2009-0116076 A | 11/2009 |
| KR | 10-2011-0002246 A | 1/2011 |

OTHER PUBLICATIONS

European Search Report issued on Apr. 10, 2012 in counterpart European Patent Application No. 11193068.
Communication issued Oct. 21, 2016, issued by the European Patent Office in counterpart European Patent Application No. 11193068.1.
Communication issued Nov. 20, 2016, issued by the Korean Intellectual Property Office in counterpart Korean Patent Application No. 10-2011-0004542.

\* cited by examiner

FIG. 6

| WATCH LIST | | | AUTO SCHEDULING | PLAY |
|---|---|---|---|---|
| Title | Start | Time | Date | Source |
| CSI:Miami | PM5:00 | 40:00 | 2010.09.10 | CBS |
| Inception | PM5:40 | 120:00 | 2010.08.06 | Netflix |
| The Dark Knight | PM7:40 | 150:00 | 2010.08.15 | Amazon |

FIG. 7A

| WATCH LIST | | | AUTO SCHEDULING | PLAY |
|---|---|---|---|---|
| Title | Start | Time | Date | Source |
| The Dark Knight | PM5:00 | 150:00 | 2010.08.15 | Amazon |
| 7 O'CLOCK NEWS | PM7:00 | 60:00 | 2010.12.29 | KBS1 |
| Inception | PM8:00 | 120:00 | 2010.08.06 | Netflix |

FIG. 7B

| WATCH LIST | | | AUTO SCHEDULING | PLAY |
|---|---|---|---|---|
| Title | Start | Time | Date | Source |
| Inception | PM5:00 | 120:00 | 2010.08.06 | Netflix |
| 7 O'CLOCK NEWS | PM7:00 | 60:00 | 2010.12.29 | KBS1 |
| The Dark Knight | PM8:00 | 150:00 | 2010.08.15 | Amazon |

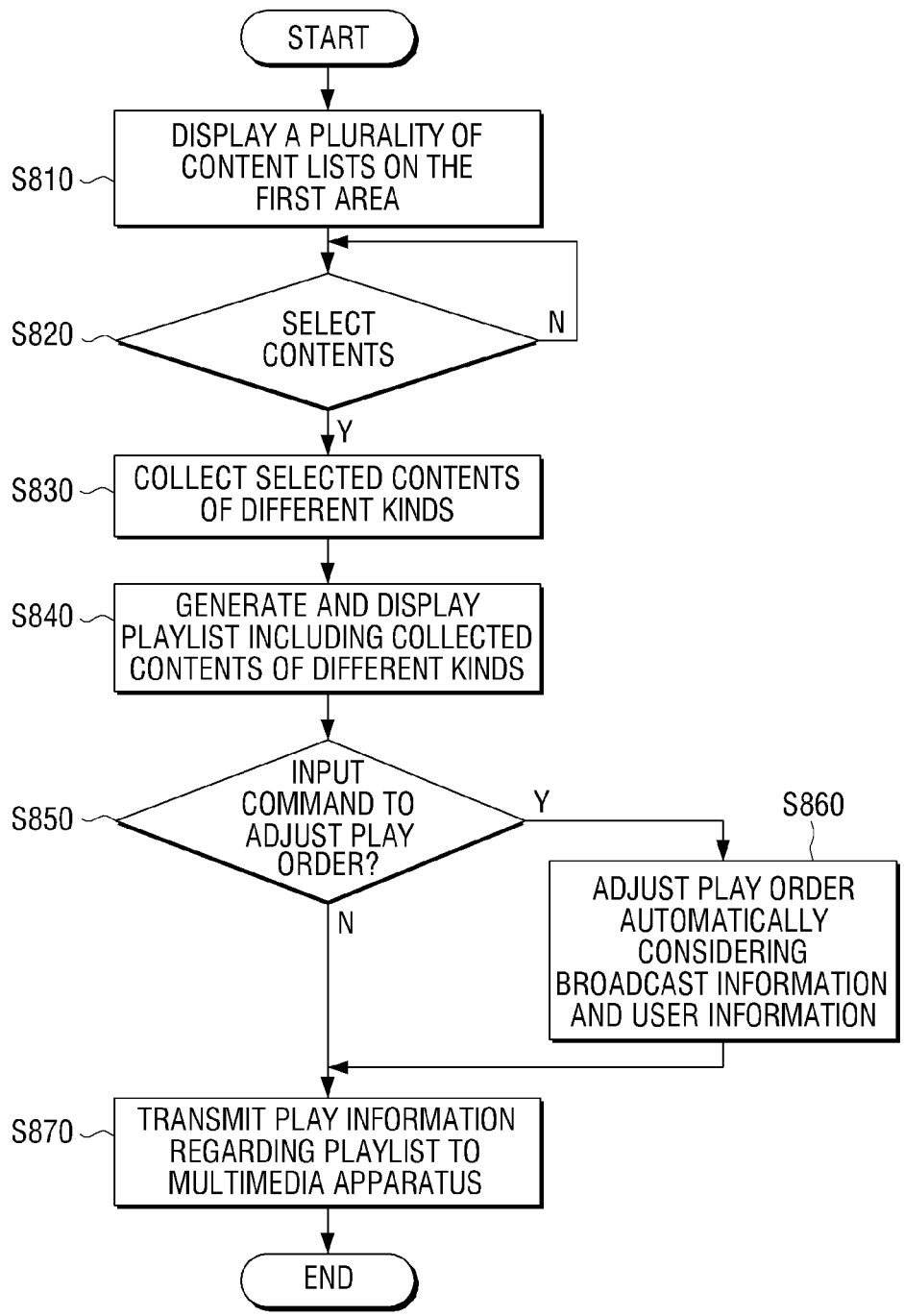

METHOD FOR PROVIDING PLAYLIST, REMOTE CONTROLLER APPLYING THE SAME, AND MULTIMEDIA SYSTEM

CROSS-REFERENCE TO RELATED APPLICATION

This application claims priority from Korean Patent Application No. 2011-0004542, filed in the Korean Intellectual Property Office on Jan. 17, 2011, the disclosure of which is incorporated herein by reference in its entirety.

BACKGROUND

1. Field

Systems and methods consistent with exemplary embodiments relate to a method for providing a playlist, a remote controller applying the same, and a multimedia system, and more particularly, to a method for providing a playlist including information regarding playing contents in a multimedia apparatus, a remote controller applying the same, and a multimedia system.

2. Description of the Related Art

As Internet communication technology has been developing, a multi-media apparatus has been introduced, and new media contents have appeared, the number of contents that a user may enjoy has been increasing exponentially. Also, the type of contents has also been diversified. In addition, technological development of a multimedia apparatus has allowed a single multimedia apparatus to execute various types of contents. Therefore, there is a need for a method of managing and playing contents desired by a user in an easier and more convenient way.

Conventionally, a separate browser or viewer should be executed for each type of contents in order to browse the contents. For example, if a user wishes to view a plurality of photos continuously via a slide show of a photo browser and then play a plurality of videos, the user should end the photo browser, compose a playlist of videos by executing a video browser, and play the videos. In the case of broadcast contents, a user should compose a broadcast program list by reserving desired broadcast programs on an EPG and then watch the programs at each broadcast time of the reserved programs. That is, a playlist should be generated and managed separately for each type of contents, causing inconvenience to a user.

Accordingly, a method for generating and managing a playlist for various types of contents is required.

SUMMARY

An aspect of the exemplary embodiments relates to a method for providing a playlist in which a plurality of content lists where each of the lists contains the same type of contents are displayed on a first area of a screen, if different types of contents are selected from the plurality of content lists, the selected contents of the different kinds of contents are collected, and a playlist including information regarding playing of the selected contents of the different kinds of contents is generated, a remote controller applying the same, and a multimedia system.

A method for providing a playlist, according to an exemplary embodiment, includes displaying a plurality of content lists of a plurality of kinds of contents in which contents of a same kind are arranged together, the plurality of content lists being displayed on a first area of a screen, if at least two different kinds of contents are selected from the plurality of content lists in a selecting, collecting the selected contents of the at least two different kinds of contents, and generating and displaying a playlist including play information regarding the collected contents of the at least two different kinds of contents.

The selecting may include comprise dragging and dropping the at least two different kinds of contents in the content lists displayed on the first area of the screen, on a collection icon displayed on a second area of the screen.

If the selected contents of the at least two different kinds of contents include a broadcast content, the generating and displaying the playlist may include generating and displaying the playlist by adjusting a play order according to a broadcast schedule and a play time of the broadcast content.

The generating and displaying may include, if a time during which content is not watched is input, generating and displaying the playlist based on a time during which the content is not watched from among a viewing time of the selected contents of the at least two different kinds of contents.

The play information regarding the playlist may include at least one from among a title, a type, a play start time, a play time, a source, and a thumbnail.

The displaying the plurality of content lists on the first area of the screen may include arranging and displaying the contents according to one from among a user's preference, a recommendation, popularity, being up-to-date, a date, a definition tag, and a genre.

The plurality of content lists may comprise thumbnails corresponding to at least one content included in the respective content lists.

The method may further include transmitting information regarding the generated playlist to an external apparatus through a communication unit.

The one of the plurality of kinds includes one from among broadcast content, photo content, music content, video content, VOD content, web-page content, E-Book content and document content.

A remote controller, according to an exemplary embodiment, includes a display unit which displays a plurality of content lists of a plurality of kinds of contents in which contents of a same kind are arranged in a first area, a user input unit which receives a user's command, and a control unit which, if at least two different kinds of contents are selected and collected from the plurality of content lists through the user input unit, generates and displays a playlist including play information regarding the collected contents of the at least two different kinds of contents.

The user input unit may be a touch screen, and the control unit, if the at least two different kinds of contents of the content lists displayed on the first area of the screen is dragged and dropped on a collection icon displayed on a second area of the screen through the touch screen, may select and collect the contents.

The control unit, if the selected contents of the at least two different kinds of contents include a broadcast content, may generate the playlist by adjusting a play order according to a broadcast schedule and a play time of the broadcast content.

The control unit, if a time during which a content is not watched is input, may generate the playlist based on a time during which the content is not watched from among a viewing time of the selected contents of the at least two different kinds of contents.

The play information regarding the playlist may include at least one from among a title, a type, a play start time, a play time, a source, and a thumbnail.

The plurality of content lists may include contents which are arranged according to one from among a user's preference, a recommendation, popularity, being up-to-date, a date, a definition tag, and a genre.

The plurality of content lists may consist of thumbnails corresponding to at least one content included in the respective content lists.

The remote controller may further include a communication unit which transmits information regarding the generated playlist to an external apparatus.

The one of the plurality of kinds include one from among broadcast content, photo content, music content, video content, VOD content, web-page content, E-Book content and document content.

A multimedia system, according to an exemplary embodiment, a remote controller which, if at least two different kinds of contents are selected through a user input unit from among a plurality of content lists of a plurality of kinds of contents in which contents of a same kind are arranged together on a first area of a display screen, generates and displays a playlist including information regarding the selected contents of the different kinds of contents and transmits the playlist information to outside of the remote controller and a multimedia apparatus which plays contents according to the transmitted playlist information.

BRIEF DESCRIPTION OF THE DRAWINGS

The above and/or other aspects will be more apparent by describing certain exemplary embodiments with reference to the accompanying drawings, in which:

FIG. 6 is a view illustrating a display screen including a playlist according to an exemplary embodiment;

FIGS. 7A and 7B are views illustrating a method for scheduling programs automatically taking broadcast information into consideration according to an exemplary embodiment; and FIG. 8 is a view illustrating a method for providing a playlist according to an exemplary embodiment.

DETAILED DESCRIPTION

Figure 1:
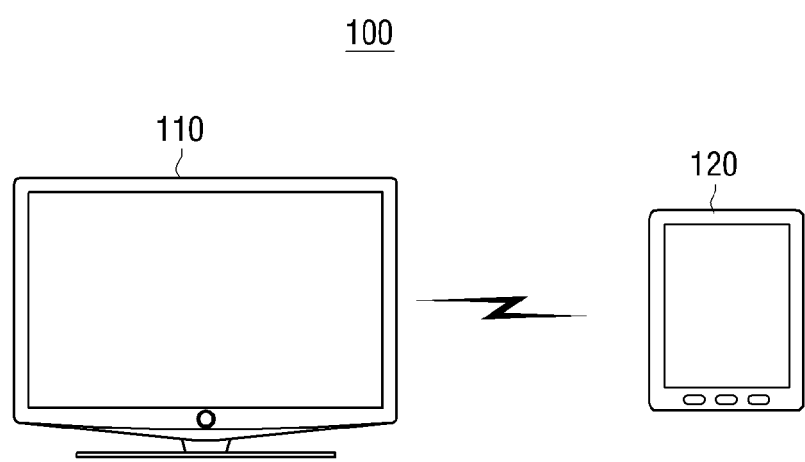
FIG. 1 is a view illustrating a multimedia system according to an exemplary embodiment.

Certain exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, the exemplary embodiments can be practiced without those specifically defined matters. Also, well-known functions or constructions are not described in detail since they would obscure the application with unnecessary detail.

FIG. 1 is a view illustrating a multimedia system 100 according to an exemplary embodiment. The multimedia system 100 according to an exemplary embodiment includes a multimedia apparatus 110 and a remote controller 120.

The multimedia apparatus 110 is an apparatus which plays multimedia content and plays multimedia content according to a user's command through the remote controller 120. Herein, the multimedia apparatus 110 may include a television (TV), an IPTV, a monitor, a projector, and a set-top box.

In particular, the multimedia apparatus 110 receives information regarding a playlist of contents from the remote controller 120 and plays contents based on the received information regarding playing of the contents (for example, the type of the contents, a start time of playing the contents, an order of playing the contents, and so on). In addition, the multimedia apparatus 110 may display a content playlist received from the remote controller 120.

Figure 2:
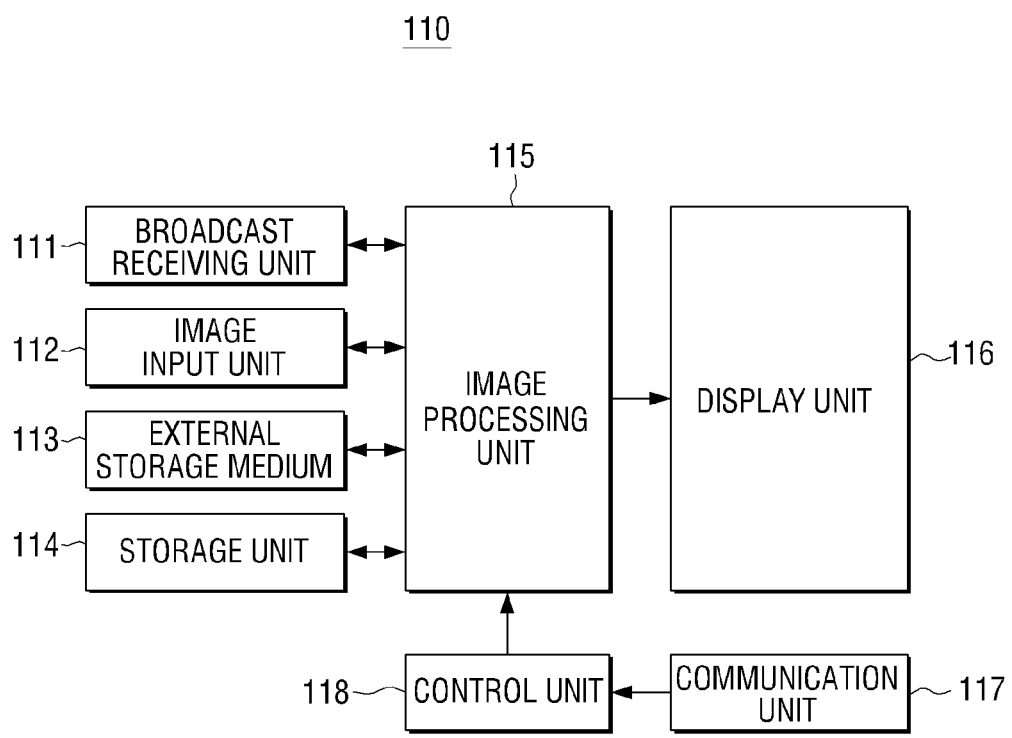
FIG. 2 is a block diagram illustrating a multimedia apparatus according to an exemplary embodiment.

Hereinafter, the multimedia apparatus 110 according to an exemplary embodiment will be explained in detail with reference to FIG. 2. As illustrated in FIG. 2, the multimedia apparatus 110 includes a broadcast receiving unit 111, an image input unit 112, an external storage medium 113, a storage unit 114, an image processing unit 115, a display unit 116, a communication unit 117, and a control unit 118.

The broadcast receiving unit 111 receives a broadcast signal from a broadcasting station or a satellite via wire or wirelessly and demodulates the received broadcast signal. Herein, the broadcast receiving unit 111 includes a tuner unit (not shown) which selects a received broadcast signal.

The image input unit 112 is connected to an external apparatus, such as a camera and a DVD player, and receives an image from the external apparatus. The external apparatus may be connected wirelessly or via cables through an interface such as S-Video, Component, Composite, D-Sub, DVI, and HDMI.

The external storage medium 113 is connected to the multimedia apparatus 110 and provides image contents. In this case, the external storage medium 113 may be a storage medium, such as a USB and an external hard disk.

The storage unit 114 stores an image received from the broadcast receiving unit 111 or the image input unit 112, and if a user's command is input, provides the stored image to the image processing unit 115. The storage unit 114 may be embodied as a hard disk, a non-volatile memory, and so on.

The image processing unit 115 performs signal processing such as video decoding and video scaling, with respect to an input image signal. In addition, the image processing unit 115 performs signal processing, such as audio decoding, with respect to an input audio signal.

Furthermore, the image processing unit 115 outputs the signal-processed image signal and audio signal to the display unit 116 and the audio output unit (not shown) respectively.

The display unit 116 outputs an image transmitted from the image processing unit 115 so that the image may be displayed on a screen. In addition, the display unit 116 may output an on-screen display (OSD) generated by an OSD generating unit (not shown).

The communication unit 117 communicates with an external apparatus and an external network. In particular, the communication unit 117 receives information regarding a playlist of contents from the remote controller 120. In addition, the communication unit 117 transmits information regarding playable contents to the external remote controller 120.

The control unit 118 controls the overall operation of the multimedia apparatus 110 according to a user's command received from the remote controller 120. In particular, the control unit 118 controls to play contents according to playlist information received from the remote controller 120. In addition, the control unit 118 may control to display playlist information received from the remote controller 120.

Referring back to FIG. 1, the remote controller 120 receives a user's command and transmits the user's command to the external multimedia apparatus 110. In particular, the remote controller 120 according to an exemplary embodiment includes a display unit. The remote controller 120 may be embodied not only as a general remote controller including a display unit, but also as a tablet PC or a mobile phone.

The remote controller 120 generates a list for different kinds of contents. Specifically, if different types of contents are selected from a plurality of content lists, where each of the lists contains the same type of contents, through the user input unit 124, the remote controller 120 generates a playlist including information regarding the selected different kinds of contents and displays the playlist on the first area of a display screen. In addition, the remote controller 120 transmits playlist information to the multimedia apparatus 110.

Figure 3:
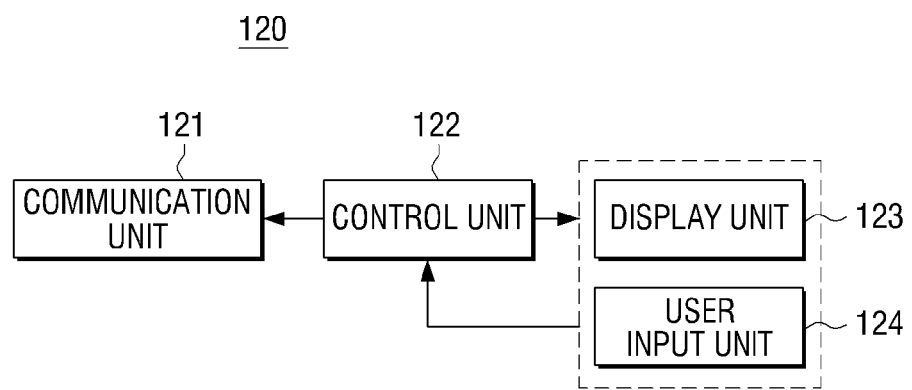
FIG. 3 is a block diagram illustrating a remote controller according to an exemplary embodiment.

Hereinafter, the remote controller 120 according to an exemplary embodiment will be explained in detail with reference to FIG. 3. As illustrated in FIG. 3, the remote controller 120 includes a communication unit 121, a control unit 122, a display unit 123, and a user input unit 124.

The communication unit 121 performs communication with the communication unit 117 of the external multimedia apparatus 110. In particular, the communication unit 121 transmits playlist information generated according to a user's command input by the user input unit 124 to the multimedia apparatus 110. In addition, the communication unit 121 receives information regarding contents executable in the multimedia apparatus 110 from the multimedia apparatus 110.

The display unit 123 displays a menu screen for controlling the multimedia apparatus 110 through the remote controller 120. In particular, the display unit 123 displays a content browsing screen for generating a playlist of contents to be played on the multimedia apparatus 110. The generated content browsing screen will be explained with reference to FIG. 4.

Figure 4:
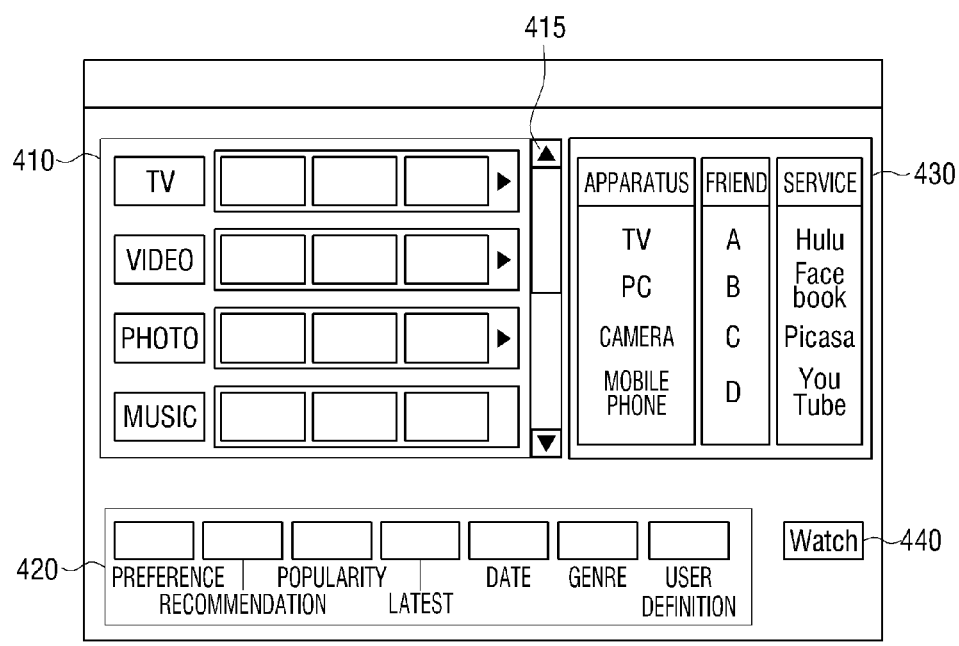
FIG. 4 is a view illustrating a display screen including a content list according to an exemplary embodiment.

As illustrated in FIG. 4, a content browsing screen for generating a playlist of contents to be played on the multimedia apparatus 110 includes a plurality of content lists 410, an arrangement icon 420, a multimedia connection information list 430, and a collection icon 440.

The plurality of content lists 410 include a content list where contents of the same kind are arranged together. For example, as illustrated in FIG. 4, a TV content (a broadcast content) list, a video content list, a photo content list, and a music content list, are shown. The exemplary embodiments may be applied to various content lists such as a VOD content list, a web page content list, an E-book content list, and a document content list.

The contents in a content list may be searched as a scroll bar 415 is scrolled in a left or right direction, and a content list for each type of contents may be searched as the scroll bar 415 is scrolled in an upper or lower direction in the area of the plurality of content lists 410.

The arrangement icon 420 is an icon for setting an arrangement standard for a plurality of content lists. For example, if a recommendation icon is selected, only contents recommended by a business provider is included in a list. If an up-to-date icon is selected, only contents updated within a specific period time is included in a list. If a genre icon is selected and then a specific genre (for example, action) is selected, only those contents which belong to the action genre are included in a list. However, this is only an exemplary embodiment, and the content lists may be arranged according to a standard such as preference, popularity, date, and a user's definition, as illustrated in FIG. 4.

The multimedia connection information list 430 includes a list of apparatuses connected to the multimedia apparatus 110, a list of friends connected to an external network and a list of services provided by an external network.

The collection icon 440 is an icon to include a specific icon in a playlist and includes a specific icon in a playlist when the specific content is dragged and dropped to be a collection icon.

Referring back to FIG. 3, the user input unit 124 receives a user's command. In particular, according to an exemplary embodiment, the user input unit 124 may be a touch screen. However, this is only an example, and the exemplary embodiments may be applied to other input apparatuses, such as a mouse and a pointing device.

The control unit 122 controls the overall operation of the remote controller 120 according to a user command input to the user input unit 124. In particular, the control unit 122 may control to generate a playlist for playing contents of the multimedia apparatus 110.

Specifically, if a user inputs a specific command to generate a playlist, the control unit 122 controls to generate and display a content browsing screen as illustrated in FIG. 4.

In addition, if different kinds of contents are selected and collected from a plurality of content lists through the user input unit 124, the control unit 122 controls to generate and display a playlist including play information regarding the different kinds of collected contents.

Figure 5:
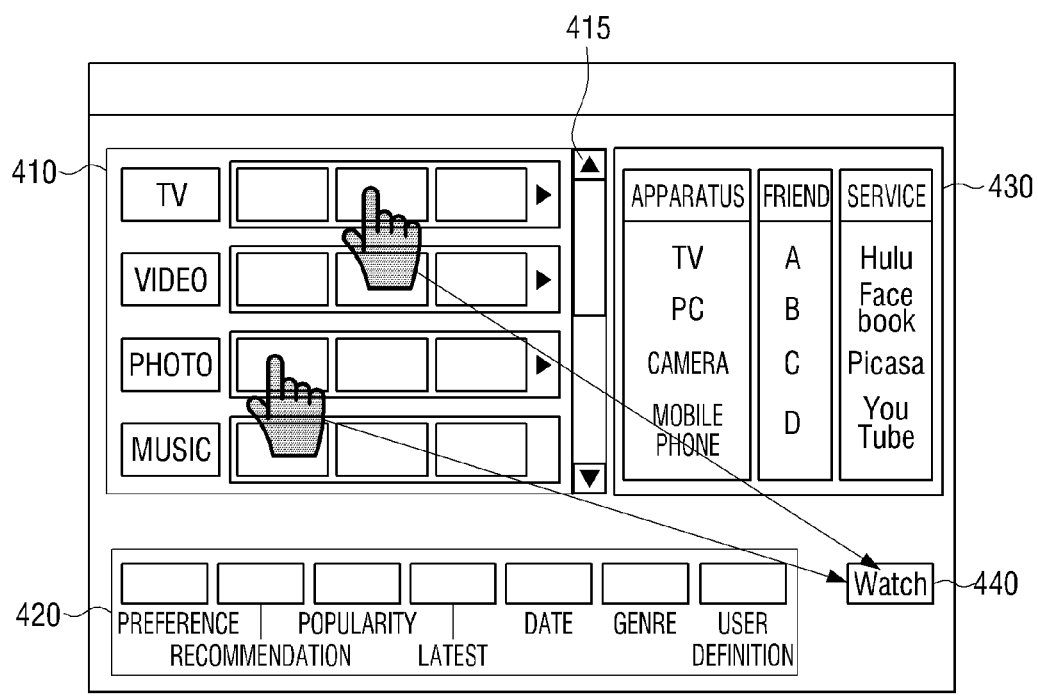
FIG. 5 is a view illustrating a method for selecting different kinds of contents according to an exemplary embodiment.

Specifically, as illustrated in FIG. 5, if contents included in the plurality of content lists 410 are touched, dragged and dropped as the collection icon 440, the control unit 122 collects the contents. In this case, the collected contents may be a plurality of different kinds of contents. For example, if broadcast content is dragged and dropped as the collection icon 440, video content is dragged and dropped as the collection icon 440, and music content is dragged and dropped as the collection icon 440, the control unit 122 may collect the broadcast content, the video content, and the music content.

In addition, when the control unit 122 collects different kinds of contents, play information regarding the different kinds of contents may be input through the user input unit 124. In this case, a play start time may be included in the input play information. In particular, if the contents are photo contents, a play time may be included.

If different kinds of contents are collected, the control unit 122 controls to generate and display a playlist screen regarding the different kinds of collected contents as illustrated in FIG. 6. In this case, the displayed playlist screen includes a playlist 600 including play information, an automatic scheduling icon 610 and a play icon 620.

The playlist 600 includes play information regarding collected contents. In this case, the play information may include a title of content, a play start time, a play time, a date, a source, and so on as illustrated in FIG. 6. However, this is only an example, and the playlist may also include the type of content, a recommendation level, a thumbnail, and so on.

In general, the playlist schedules a program in the order of contents collected by a user. For example, if a user has collected contents in the order of "CSI: Miami", "Inception", and "The Dark Knight", the playlist 600 may schedule the programs in the order of "CSI: Miami", "Inception", and "The Dark Knight" as illustrated in FIG. 6.

In addition, if one of "Title", "Time", "Date", and "Source" displayed on the playlist 600 is touched in a row, the playlist 600 may schedule the contents in a decreasing or increasing order with respect to the touched item. For example, if "Time" is touched in a row, the playlist 600 may schedule the contents in the order of low play time, and if "Time" is touched in a row again, the playlist 600 may schedule the contents in the order of high play time.

The automatic scheduling icon 610 is an icon for scheduling a playlist automatically considering user information and broadcast information (a broadcast start time and a broadcast finish time).

Specifically, the method of scheduling a playlist considering broadcast information will be explain with reference to FIGS. 7A and 7B.

As illustrated in FIG. 7A, the playlist 600 includes three items of contents. In this case, the play start time of the video content, "The Dark Knight", is 5 pm., and its play time is 150 minutes. The play start time of the broadcast content, "7 o'clock news", is 7 pm., and its play time is 60 minutes. In addition, the play start time of the VOD content, "Inception", is 8 pm, and its play time is 120 minutes.

If the three items of contents are played as described above, the video content, "The Dark Knight" may not be played for about 30 minutes since the start time of a broadcast content is fixed. Alternatively, the broadcast content, "7 o'clock news" may not be played for 30 minutes. That is, if broadcast content is included, specific content may not be played in its entirety due to a broadcast schedule of broadcast contents and play times of other contents.

In order to solve the above problem, the control unit 122 may generate a playlist by adjusting the play order of contents included in a playlist if the automatic scheduling icon 610 illustrated in FIG. 7A is selected.

Specifically, if the automatic scheduling icon 610 is selected, the control unit 122 selects contents provided in real time by selecting contents having information regarding the broadcast start time (or the play start time) from among contents collected in a playlist and extracts the broadcast start time and the play time (or the broadcast finish time) of the contents in order to schedule contents automatically considering contents provided in real time as a top priority. For example, as illustrated in FIG. 7A, the broadcast start time and the play time of "7 o'clock news" which is a content provided in real time from among the three items of contents are extracted.

In addition, the control unit 122 determines a play schedule of contents provided in real time and extracts play information of contents excluding the contents provided in real time. The control unit 122 adjusts the play order using the play information of the contents excluding the contents provided in real time so that the play time of the real-time contents is not overlapped with the play time of the remaining contents. For example, as illustrated in FIG. 7A, the play time of the video content, "The Dark Knight" which is supposed to start at 5 o'clock, is 150 minutes and thus, the play time of "The Dark Knight" is overlapped with the play time of "7 o'clock news". Therefore, the control unit 122 changes the broadcast order of the video content, "The Dark Knight" which is supposed to start at 5 o'clock, with the broadcast order of the VOD content, "Inception" which is supposed to start at 8 o'clock. Therefore, "Inception" is finished before the broadcast content, "7 o'clock news" starts, and the broadcast content, "7 o'clock news" is played at 7 pm. Therefore, all of the three items of contents may be played without any interruption.

In addition, the control unit 122 may schedule a playlist automatically using user information. In this case, the user information may include information regarding a user's schedule, preference, viewing history, and so on.

Specifically, the control unit 122 extracts information regarding a user's schedule from information stored in the remote controller 120 and checks information regarding a case where it is difficult for a user to watch contents, such as a case where the user is away from home or a case where the user is in a place without access to a multimedia apparatus. The information regarding a user's schedule may be pre-stored in a multimedia apparatus, downloaded via the Internet, or received through an external apparatus, such as a tablet PC and a mobile phone. In addition, the control unit 122 schedules a playlist based on the information regarding a user's schedule so that a time when the user may not watch contents may be excluded from the playlist. For example, if a user goes out from 6 pm to 8 pm according to the information regarding the user's schedule, the control unit 122 schedules a playlist which does not play any content from 6 pm to 8 pm.

In addition, the control unit 122 may schedule a playlist automatically based on information regarding a user's preference, viewing history, and recommendation. Specifically, the control unit 122 may schedule a playlist automatically considering information regarding a user's preference input by the user in advance (for example, a preferred content type, a preferred content provider, a preferred content title, and so on). In this case, the control unit 122 may arrange to display content, which has been already watched by the user, later. In addition, the control unit 122 may arrange contents with the highest recommendation preferentially based on information regarding recommendation (by a third party).

As described above, if the automatic scheduling icon 610 is selected, a playlist is scheduled based on user information and broadcast schedule and thus, a user may watch all of the contents at a desired time in a desired order.

Meanwhile, in the above exemplary embodiment, if the automatic scheduling icon 610 is selected, a playlist is scheduled based on user information and broadcast schedule, but this is only an example. A playlist may be scheduled automatically based on user information and broadcast schedule if a plurality of contents are collected even if the automatic scheduling icon 610 is not selected.

The play icon 620 is an icon for inputting a command to play content according to a generated playlist. Specifically, if the play icon 620 is selected, the control unit 122 transmits the play information of a playlist to the multimedia apparatus 110 through the communication unit 121. Accordingly, the multimedia apparatus 110 plays contents according to the transmitted play information of a playlist.

If photo content is included in a playlist, the photo content may be played in a slide show. In this case, the control unit 122 may set a play time of each photo considering the number of photos included in the photo content and the play time of the photo content. For example, if a play time for a photo content is 30 minutes and there are 180 photos, the control unit 122 generates play information so that one picture may be played for 10 seconds.

As described above, according to an exemplary embodiment, different kinds of contents may be used and managed using a single list and thus, a user may use contents faster and more easily.

Hereinafter, a method for providing a playlist will be explained in detail with reference to FIG. 8. FIG. 8 is a view illustrating a method for providing a playlist according to an exemplary embodiment.

If a user's command to generate a playlist is input, the remote controller 120 displays a plurality of content lists on the first area of a display screen (S810). In this case, contents of a same kind are arranged together in the plurality of content lists.

Subsequently, the remote controller 120 determines whether content is selected according to a user's input (S820). If a content is selected (S820-Y), the remote controller collects the selected contents of the different kinds of contents (S830). When the remote controller 120 collects the contents of the different kinds of contents, play information regarding the different kinds of contents may be input through the user input unit 124. In this case, the play information may include a play start time. In particular, in the case of photo content, the play information may include a play time.

The remote controller generates and displays a playlist including the collected contents of the different kinds (S840). In this case, the generated playlist includes play information such as the title, type, play start time, play time, source and thumbnail of the contents.

After the playlist is generated and displayed, the remote controller determines whether a command to adjust a play order is input (S850). If a command to adjust a play order is input (S850-Y), the remote controller 120 adjusts the play order automatically considering broadcast information and user information (S860).

If a play command is input, the remote controller 120 transmits play information regarding the playlist to the multimedia apparatus 110 through a communication unit (S870).

As different kinds of contents are used and managed using a single list according to the above-described method for providing a playlist, a user may use contents faster and more easily.

Meanwhile, in the above exemplary embodiment, the remote controller 120 directly generates a playlist, but this is only an example. The exemplary embodiments may be applied when a playlist is downloaded from outside of the remote controller 120. For example, a playlist may be downloaded from another apparatus connected via a home network, or from an online store established on the web.

Although a few exemplary embodiments have been shown and described, it would be appreciated by those skilled in the art that changes may be made in the exemplary embodiments without departing from the principles and spirit of the inventive concept, the scope of which is defined in the claims and their equivalents.

What is claimed is:

1. A method for providing a playlist, comprising:
displaying a categorized plurality of individual content lists respectively corresponding to a plurality of kinds of contents in which only contents of a same kind are arranged together, the categorized plurality of individual content lists being displayed on a first area of a screen at a same time;
in response to at least two different kinds of contents being selected from the categorized plurality of individual content lists in a selecting, collecting the selected contents of the at least two different kinds of contents;
generating and displaying a playlist including play information regarding the collected contents of the at least two different kinds of contents; and
playing the collected contents of the at least two different kinds of contents included in the playlist sequentially,
wherein the generating and displaying comprises, if a time period, during which content will not be watched, is input, generating and displaying the playlist based on the input time period and a viewing time of each of the selected contents of the at least two different kinds of contents such that each of the selected contents having a viewing time during the input time period is excluded from the playlist, and
wherein the plurality of kinds of contents includes broadcast content, photo content, music content, video content, VOD content, web-page content, E-Book content, and document content.

2. The method as claimed in claim 1, wherein the selecting comprises dragging and dropping the at least two different kinds of contents in the plurality of individual content lists displayed on the first area of the screen, on a collection icon displayed on a second area of the screen.

3. The method as claimed in claim 1, wherein, if the selected contents of the at least two different kinds of contents include a broadcast content, the generating and displaying the playlist comprises generating and displaying the playlist by adjusting a play order of the collected contents of the at least two different kinds of contents according to a broadcast schedule and a play time of the broadcast content such that the broadcast content is reproduced at a time of reception of the broadcast content.

4. The method as claimed in claim 1, wherein the play information regarding the playlist includes at least one from among a title, a type, a play start time, a play time, a source, and a thumbnail.

5. The method as claimed in claim 1, wherein the displaying the categorized plurality of individual content lists on the first area of the screen comprises arranging and displaying the contents according to one from among a user's preference, a recommendation, popularity, being up-to-date, a date, a definition tag, and a genre.

6. The method as claimed in claim 1, wherein the categorized plurality of individual content lists comprises thumbnails corresponding to at least one content included in the respective content lists.

7. The method as claimed in claim 1, further comprising:
transmitting information regarding the generated playlist to an external apparatus through a communication unit.

8. A remote controller, comprising:
a display unit which displays a categorized plurality of individual content lists respectively corresponding to a plurality of kinds of contents in which only contents of a same kind are arranged together, the categorized plurality of individual content lists being displayed in a first area at a same time;
a user input unit which receives a user's command; and
a control unit which, if at least two different kinds of contents are selected and collected from the categorized plurality of individual content lists through the user input unit, generates and displays a playlist including play information regarding the collected contents of the at least two different kinds of contents, and controls an external apparatus to play the collected contents of the at least two different kinds of contents included in the playlist sequentially,
wherein the control unit, if a time period, during which content will not be watched, is input, generates the playlist based on the input time period and a viewing time of each of the selected contents of the at least two different kinds of contents such that each of the selected contents having a viewing time during the input time period is excluded from the playlist, and wherein the plurality of kinds of contents includes broadcast content, photo content, music content, video content, VOD content, web-page content, E-Book content, and document content.

9. The remote controller as claimed in claim 8, wherein the user input unit is a touch screen, and wherein the control unit, if contents of the categorized plurality of individual content lists displayed on the first area of the screen are dragged and dropped on a collection icon displayed on a second area of the screen through the touch screen, selects and collects the contents.

10. The remote controller as claimed in claim 8, wherein the control unit, if the selected contents of the at least two different kinds of contents include a broadcast content, generates the playlist by adjusting a play order of the collected contents of the at least two different kinds of contents according to a broadcast schedule and a play time of the broadcast content such that the broadcast content is reproduced at a time of reception of the broadcast content.

11. The remote controller as claimed in claim 8, wherein the play information regarding the playlist includes at least one from among a title, a type, a play start time, a play time, a source, and a thumbnail.

12. The remote controller as claimed in claim 8, wherein the categorized plurality of individual content lists includes contents which are arranged according to one from among a user's preference, a recommendation, popularity, being up-to-date, a date, a definition tag, and a genre.

13. The remote controller as claimed in claim 8, wherein the categorized plurality of individual content lists comprises thumbnails corresponding to at least one content included in the respective content lists.

14. The remote controller as claimed in claim 8, further comprising:

a communication unit which transmits information regarding the generated playlist to the external apparatus.

15. A multimedia system, comprising:

a remote controller which, if a plurality of kinds of contents are selected through a user input unit from among a categorized plurality of individual content lists respectively corresponding to at least two different kinds of contents in which only contents of a same kind are arranged together, the categorized plurality of individual content lists being displayed on a first area of a display screen at a same time, generates and displays a playlist including information regarding the selected contents of the at least two different kinds of contents and transmits the playlist information to outside of the remote controller; and a multimedia apparatus which plays the selected contents of the at least two different kinds of contents included in the playlist sequentially according to the transmitted playlist information, wherein the remote controller, if a time period, during which content will not be watched, is input, generates the playlist based on the input time period and a viewing time of each of the selected contents of the at least two different kinds of contents such that each of the selected contents having a viewing time during the input time period is excluded from the playlist, and wherein the plurality of kinds of contents includes broadcast content, photo content, music content, video content, VOD content, web-page content, E-Book content, and document content.

* * * * *